(12) United States Patent
Haley et al.

(10) Patent No.: US 6,181,555 B1
(45) Date of Patent: Jan. 30, 2001

(54) COOLING SYSTEM FOR INTEGRATED CIRCUIT CHIPS IN A PORTABLE COMPUTER

(75) Inventors: Kevin Haley, San Jose; Michael O'Connor, Cupertino; Rakesh Bhatia, San Jose, all of CA (US)

(73) Assignee: Intel Corporation, Santa Clara, CA (US)

(*) Notice: Under 35 U.S.C. 154(b), the term of this patent shall be extended for 0 days.

(21) Appl. No.: 09/246,777

(22) Filed: Feb. 4, 1999

Related U.S. Application Data

(60) Division of application No. 08/937,213, filed on Sep. 17, 1997, now Pat. No. 5,982,617, which is a continuation-in-part of application No. 08/536,932, filed on Sep. 29, 1995, now abandoned.

(51) Int. Cl.[7] .................................. G06F 1/20; H05K 7/20
(52) U.S. Cl. ........................... 361/687; 361/690; 361/681
(58) Field of Search .................................. 361/687, 690, 361/681, 704; 165/80.3, 185

(56) References Cited

U.S. PATENT DOCUMENTS

| | | | |
|---|---|---|---|
| 4,078,851 | 3/1978 | Albanese | 350/96.1 |
| 4,897,171 | 1/1990 | Ohmi | 204/298 |
| 5,179,498 | 1/1993 | Hongoh et al. | 361/234 |
| 5,250,137 | 10/1993 | Arami et al. | 156/345 |
| 5,382,311 | 1/1995 | Ishikawa et al. | 156/345 |
| 5,383,340 | 1/1995 | Larson et al. | 361/700 |
| 5,459,632 | 10/1995 | Birang et al. | 361/234 |
| 5,460,684 | 10/1995 | Saeki et al. | 156/345 |
| 5,467,249 | 11/1995 | Barnes et al. | 361/234 |
| 5,478,429 | 12/1995 | Komino et al. | 156/345 |
| 5,491,603 | 2/1996 | Birang et al. | 361/234 |
| 5,504,605 | 4/1996 | Sakuma et al. | 359/83 |
| 5,525,159 | 6/1996 | Hama et al. | 118/723 I |
| 5,529,657 | 6/1996 | Ishii | 156/345 |
| 5,557,215 | 9/1996 | Saek et al. | 324/765 |
| 5,569,350 | 10/1996 | Osada et al. | 156/345 |
| 5,571,366 | 11/1996 | Ishii et al. | 156/345 |
| 5,591,269 | 1/1997 | Arami et al. | 118/723 R |
| 5,606,341 | 2/1997 | Aguilera | 361/718 |
| 5,621,613 | 4/1997 | Haley et al. | 361/687 |
| 5,628,363 | 5/1997 | Dewar et al. | 165/164 |
| 5,634,351 | 6/1997 | Larson et al. | 361/687 |
| 5,666,261 | 9/1997 | Aguilera | 361/681 |
| 5,774,333 | * 6/1998 | Janik et al. | 361/687 |

FOREIGN PATENT DOCUMENTS

WO 97/12313   4/1997   (WO).
WO 98/08158   2/1998   (WO).

* cited by examiner

*Primary Examiner*—Lynn D. Feild
(74) *Attorney, Agent, or Firm*—Blakely, Sokoloff, Taylor & Zafman LLP

(57) ABSTRACT

A computer system, such as a notebook computer, that includes a lid having integrated circuit components that require heat dissipation while protecting the screen display of the lid.

23 Claims, 5 Drawing Sheets

COOLING SYSTEM FOR INTEGRATED CIRCUIT CHIPS IN A PORTABLE COMPUTER

This is a divisional of application Ser. No. 08/937,213, filed Sep. 17, 1997, U.S. Pat. No. 5,982,617 which is a continuation-in-part of Ser. No. 08/536,932, filed Sep. 29, 1995, ABN which applications are assigned to the assignee of the present invention.

FIELD OF THE INVENTION

The present invention relates to the field of computer systems; more particularly, the present invention relates to computer systems that include electronic components in lid assemblies that need to dissipate heat generated by the electronic components therein.

BACKGROUND OF THE INVENTION

Today, computer systems include many electronic components that include integrated circuit devices and/or multi-chip modules. These integrated circuit chips may include at least one central processing unit. Newer versions of integrated circuits, such as the CPUs, are often faster, yet require more power; even so, newer electronic components are often most desired.

Many electronic components generate heat as a result of their use. The amount of heat that is generated by these components may cause harm to other components in the computer system. Therefore, computer systems typically include some mechanism to dissipate the heat produced by these electronic components, thereby protecting those components which may be damaged by such heat. In desktop and mainframe computer systems, fans are often included to help dissipate the heat generated by these electronic components. Also, heat sinks may be attached to selected electronic components to help dissipate heat by spreading out the heat over a larger surface. Although the heat sinks and fans may be used to cool larger systems, they are not always effective in dissipating heat generated in notebook or portable type computers. This is because the small form factor associated with notebook computers makes it difficult to include the components while maintaining its small size. Furthermore, users often do not like the vibration and noise associated with a fan.

Another problem that may be associated with dissipating heat in notebook computers that may be attributed to the small form factor is that heat can be concentrated at certain spots of the external casing of the notebook computer. These "hot spots" on the external skin may be uncomfortable to the touch and may cause injury. Therefore, for heat dissipation in notebook computers, it is desirable to dissipate the heat in such a way so as to avoid creating hot spots.

One solution in the prior art to dissipating heat in a portable computer is described in U.S. Pat. No. 4,980,848, entitled "Heat-Exchange Panel for Portable Computer", issued Dec. 25, 1990. A computer system is described having a lid that includes a central processing unit (CPU) mounted behind an LCD visual display. The front of the display provides support for circuit boards in a spaced-parallel relationship to the LCD screen and the rear cover. When the lid is open, air flows by convection through lower vent holes in the cover, over both sides of the board containing the CPU, and exits through upper vent holes in the lid. Two problems associated with the lid assembly is that the space available for passive venting of air through the lid assembly does not provide significant heat transfer and increases the overall dimensions of the portable computer. The inclusion of this added space is in direct conflict with desires to reduce the size of portable computers while only providing very limited transfer of heat from the electronics to the ambient surrounding environment. Furthermore, in such an arrangement, there is no adequate protection to the LCD display from the heat that is generated by the components in the circuit boards contained within the lid.

Thus, a need exists to provide a heat dissipation/cooling system for notebook computers that is very efficient, yet provides only a minimal increase the overall size of the notebook, or portable, computer.

SUMMARY OF THE INVENTION

A computer system is described that includes a base supporting a lid assembly. The base includes at least a keyboard assembly. In one embodiment, the lid assembly comprises a front bezel, a LCD panel, a thermal insulating layer, an electronic module, a thermal plate, and a plastic case.

In an alternate embodiment, the lid assembly includes two sub-assemblies. The first sub-assembly includes a display (e.g., an LCD display) and an insulating layer. The insulating layer has a high thermal resistance. The second sub-assembly includes a circuit board containing electronic components. The second-sub assembly also includes an integral thermal transfer component that is coupled to the circuit board to transfer heat generated by the electronic components to as large an area as possible (based on the size of the computer system). The computer system also includes a coupling mechanism that couples the first and second sub-assemblies together. The coupling mechanism is able to maintain the first and second sub-assemblies in a spaced-apart relationship when the lid assembly is separate from the base (i.e., the lid is open) to create a vented air space that enables air flow over the electronic components. The coupling mechanism also forces the first and second sub-assemblies together to eliminate air space when the lid is in contact with the base (i.e., the lid is closed).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A computer system including a thermal plate cooling arrangement is described. In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Figure 1:
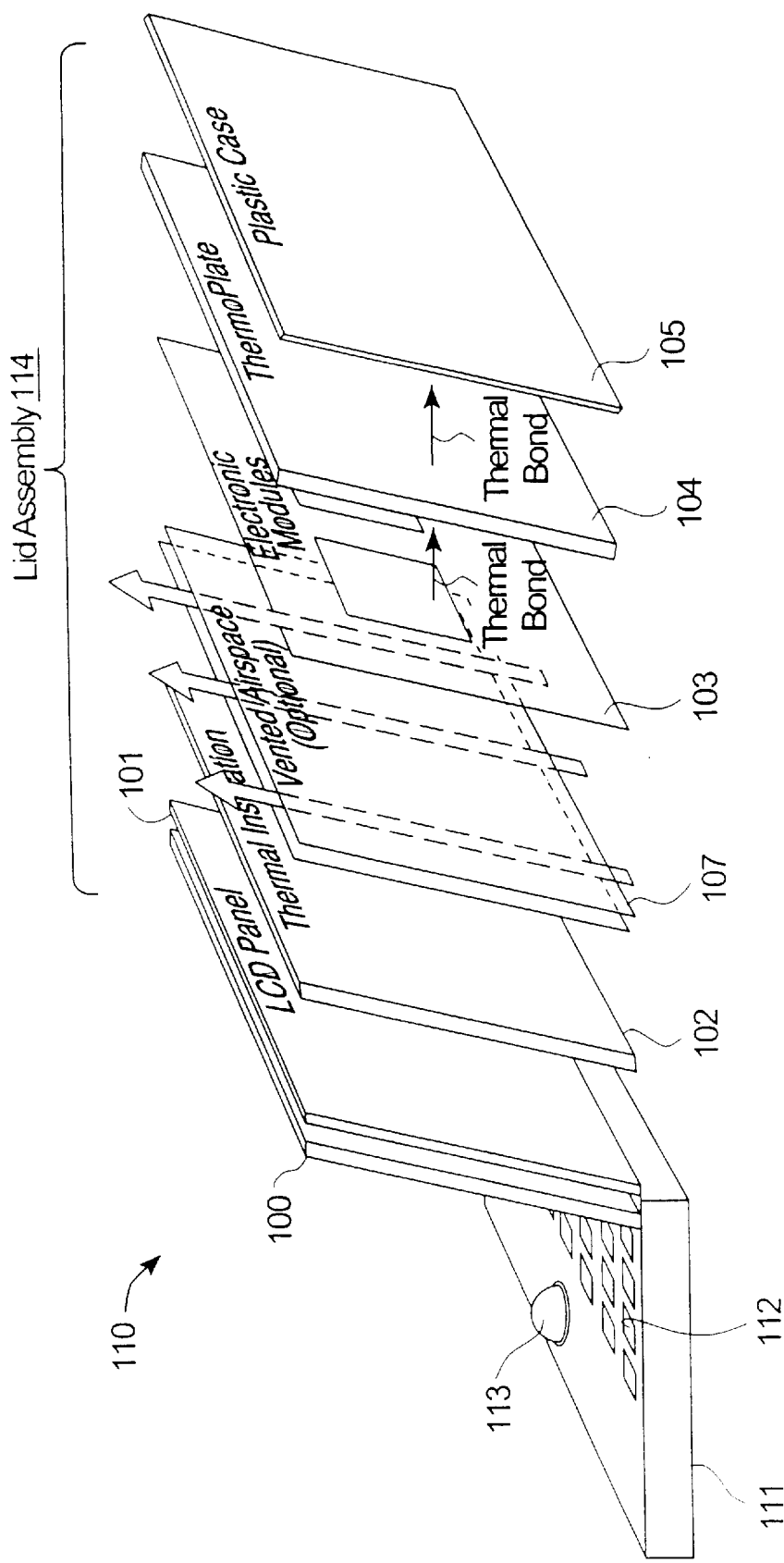
FIG. 1 is a perspective view of the cooling system employed in one embodiment of the computer system of the present invention.

Referring to FIG. 1, a portable, or notebook, computer system 110 is illustrated and includes generally a base 111 having a keyboard 112, a a cursor control device 113 (e.g., a trackball) and a lid assembly 114 pivotally mounted on the base.

Base 111 may include various other components often found in computer systems, such as a disk drive, a hard drive, a power supply, battery pack, optional board slots for other features such as modems and memory expansion, etc.

Lid 114 assembly comprises various components of a thermal plate cooling system of the computer system of the present invention. Referring to FIG. 1, a display, such as an LCD panel 101 is coupled to front mounting base 100. Thermal insulation 102 is coupled with adhesive to the back of the LCD panel 101 to form an insulating layer having a high thermal resistance. In one embodiment, the thermal insulation has a thickness of approximately one millimeter and is comprised of closed cell foam. The LCD panel in conjunction with the thermal insulation form a first sub-assembly of the lid of the computer system. Another sub-assembly of the lid includes electronic components 103 such as integrated circuits and/or multi-chip modules coupled to a circuit board or other electronic signal transferring mechanism (e.g., wires) coupled to a thermal plate 104. In one embodiment, electronic modules 103 are coupled to thermal plate 104 via a molded thermal bond. Thermal bonding is well-known in the art. Thermal plate 104 is a thermal conductive layer or plate that transfers heat generated by electronic components 103 to as large an area as possible. In one embodiment, thermal plate 104 is comprised of high thermal conductivity carbon fibers bonded into a 3 mm thick panel.

Attached to thermal plate 104 is the external casing 105 of lid assembly 114. In one embodiment, external casing 105 is attached to thermal plate 104 with an adhesive that transfers heat well.

In one embodiment, external casing 105 comprises an external plastic case. In another embodiment, external casing 105 includes an integrated thermal plate that is carbon fiber embedded in a binding material.

The embodiment of FIG. 1 comprises a front bezel 100, LCD panel 101, thermal insulating layer 102, electronics modules 103, thermal plate 104, and plastic case with little or no venting air space between the electronics modules 103 and thermal insulating layer 102. These components are fixed in a solid assembly.

In an alternative embodiment, between the first sub-assembly and the second sub-assembly of lid assembly 114 is an expandable vented air space 107. In the present invention, when lid assembly 114 is closed and not separated from base 111, such as being latched, hooked or snapped into base 111, the thermal insulation is substantially contacting electronic component modules 103 coupled to thermal plate 104. That is, there is only a minimal amount of space between the two, if any, that would permit the flow of air between thermal insulation layer 102 and electronic component modules 103. When lid assembly 114 is separated from base 111 (i.e., lid assembly 114 is open), the present invention creates a vented air space that enables the air flow over electronic components 103, by either natural convection or with fan assisted airflow. In order to create such an air space, the present invention includes a coupling mechanism that couples the first and second subassemblies (denoted by numerals 120 and 121, respectively, in FIG. 2) to each other and allows for a spaced-apart relationship when lid assembly 114 is separated from base 111 (i.e., when lid assembly 114 is open), while removing the spaced-apart relationship when lid assembly 114 is no longer separated from base 111 (i.e., lid assembly 114 is closed).

Figure 2:
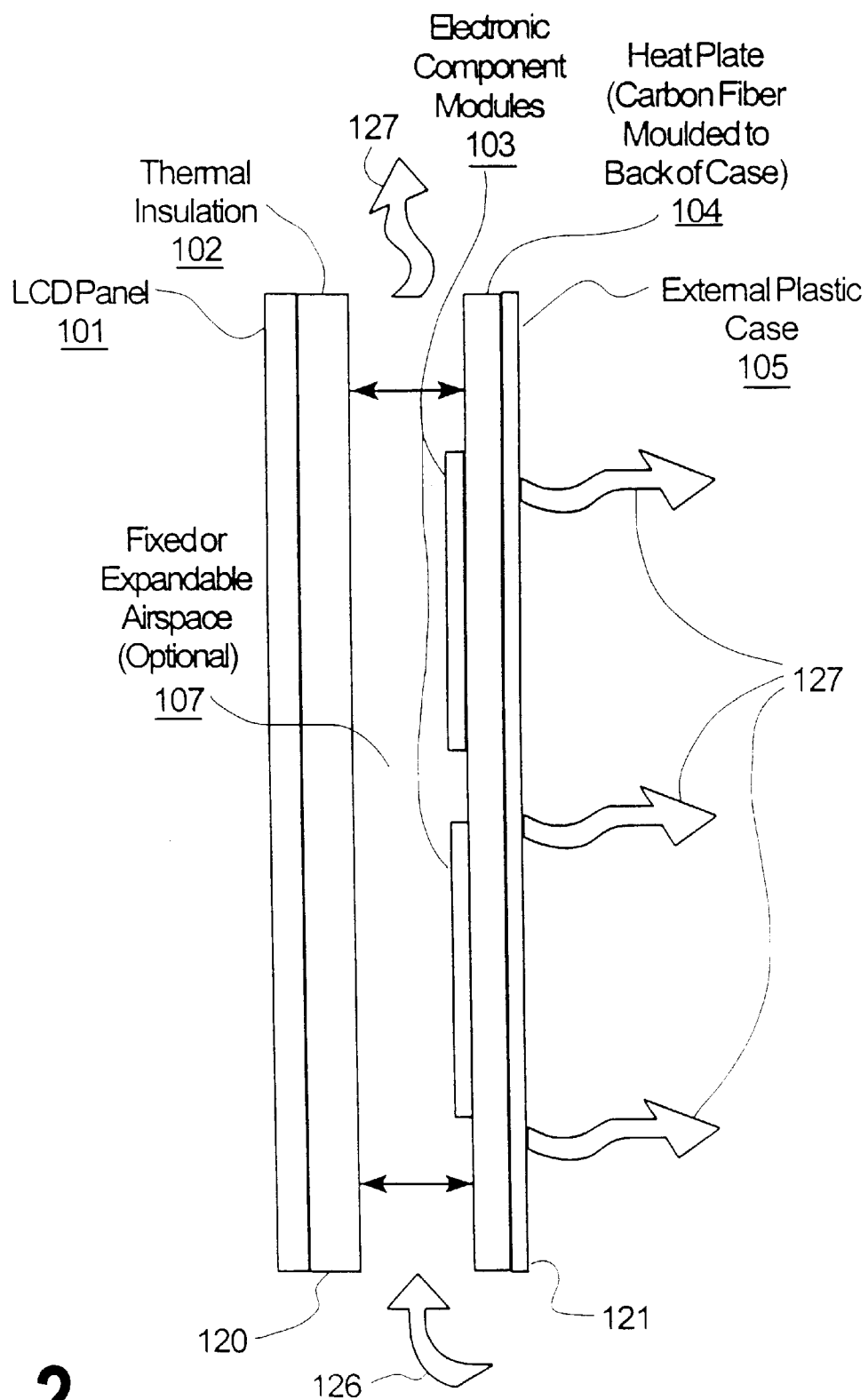
FIG. 2 illustrates a side view of the cooling system of the present invention.

FIG. 2 illustrates the vented air space 107 of the present invention that is created when lid assembly 114 is open. Note that the coupling mechanism is described later, and is not shown in FIG. 2 or FIG. 1 to avoid obscuring the relationship between the components in the lid assembly of the present invention. In FIGS. 2–5, heat dissipation is illustrated by arrows 127 and air flow is represented by arrow 126.

Figure 3:
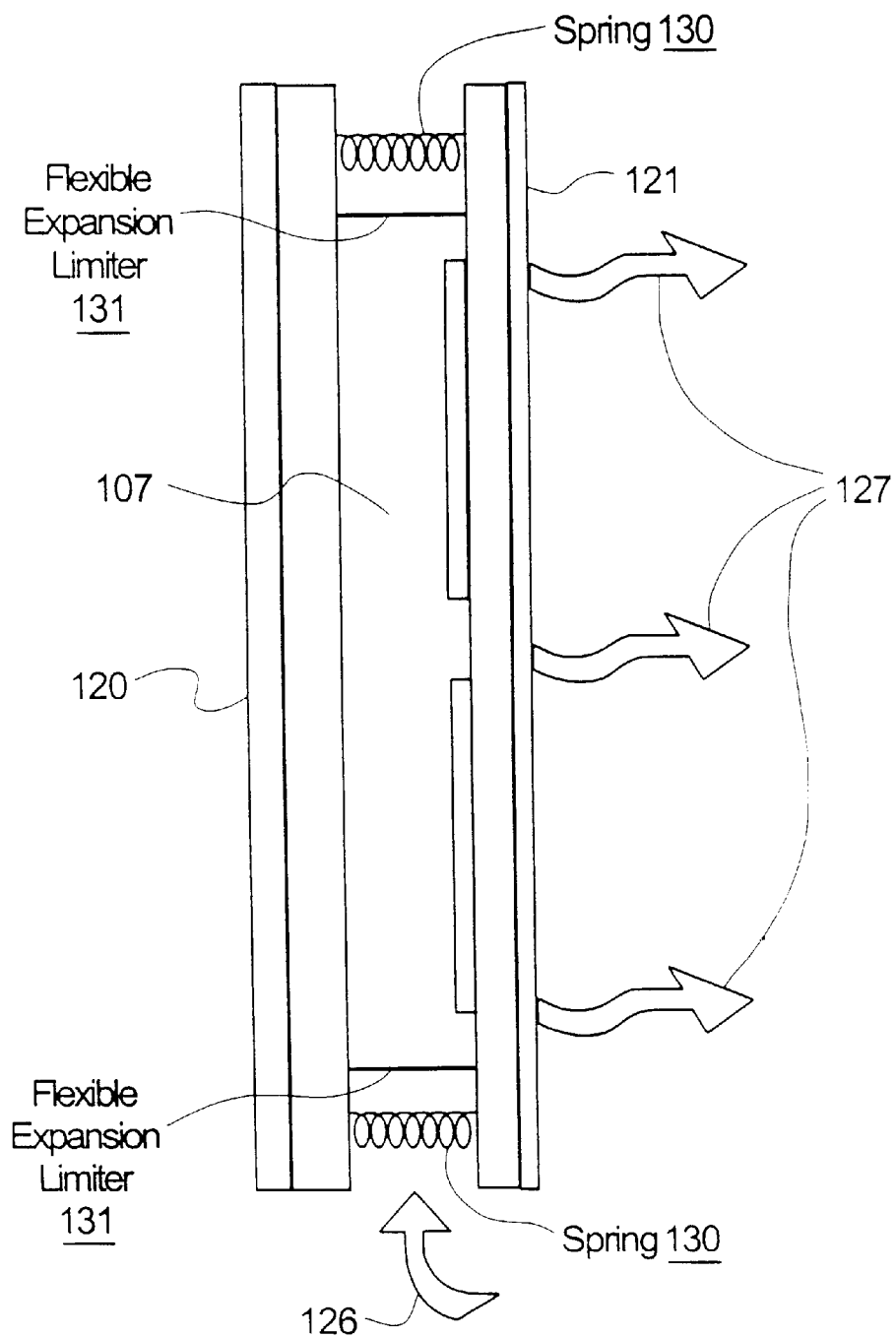
FIGS. 3, 4 and 5 illustrate various coupling mechanisms for use with the lid assembly of the present invention.
Figure 4:
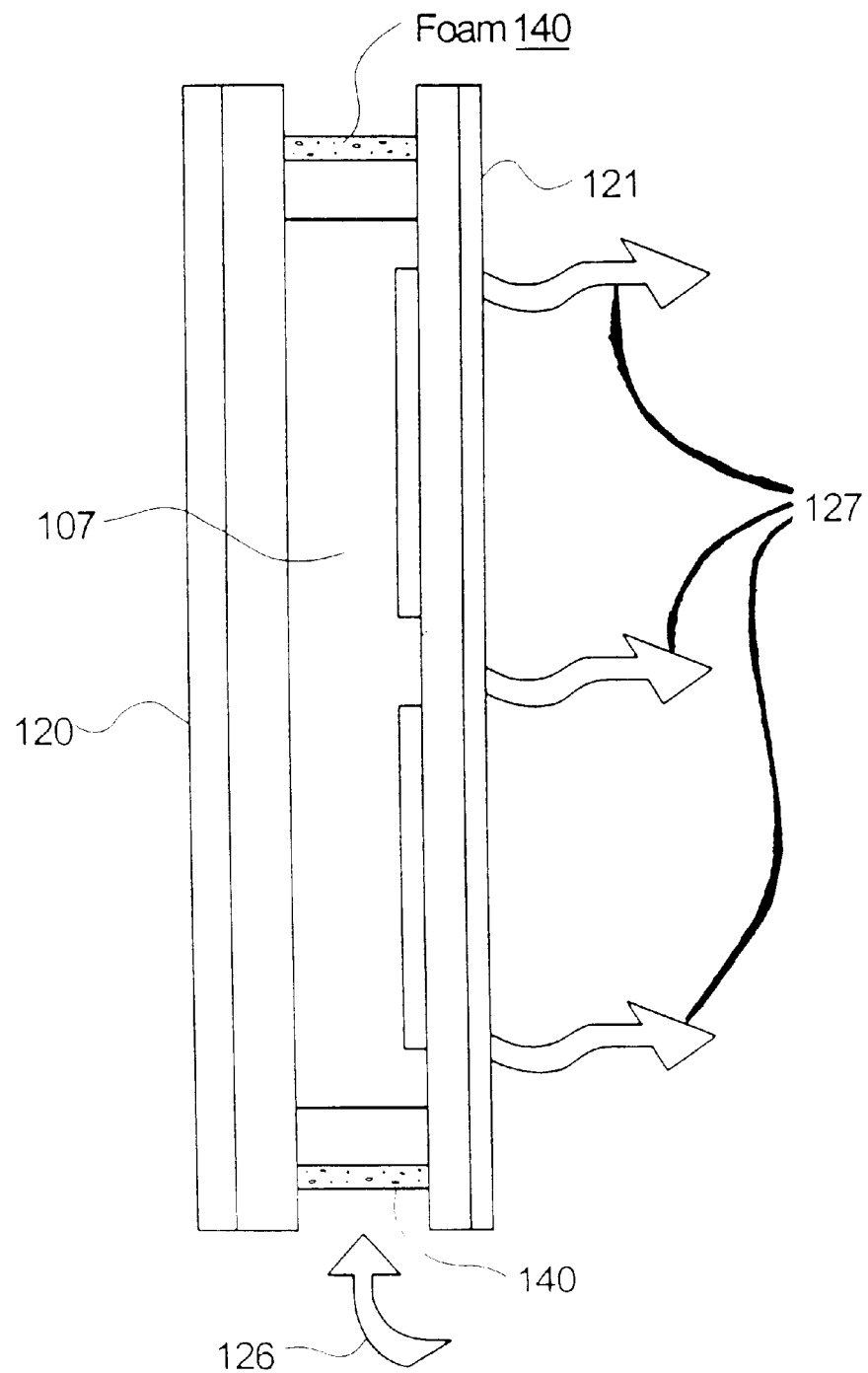
Figure 5:
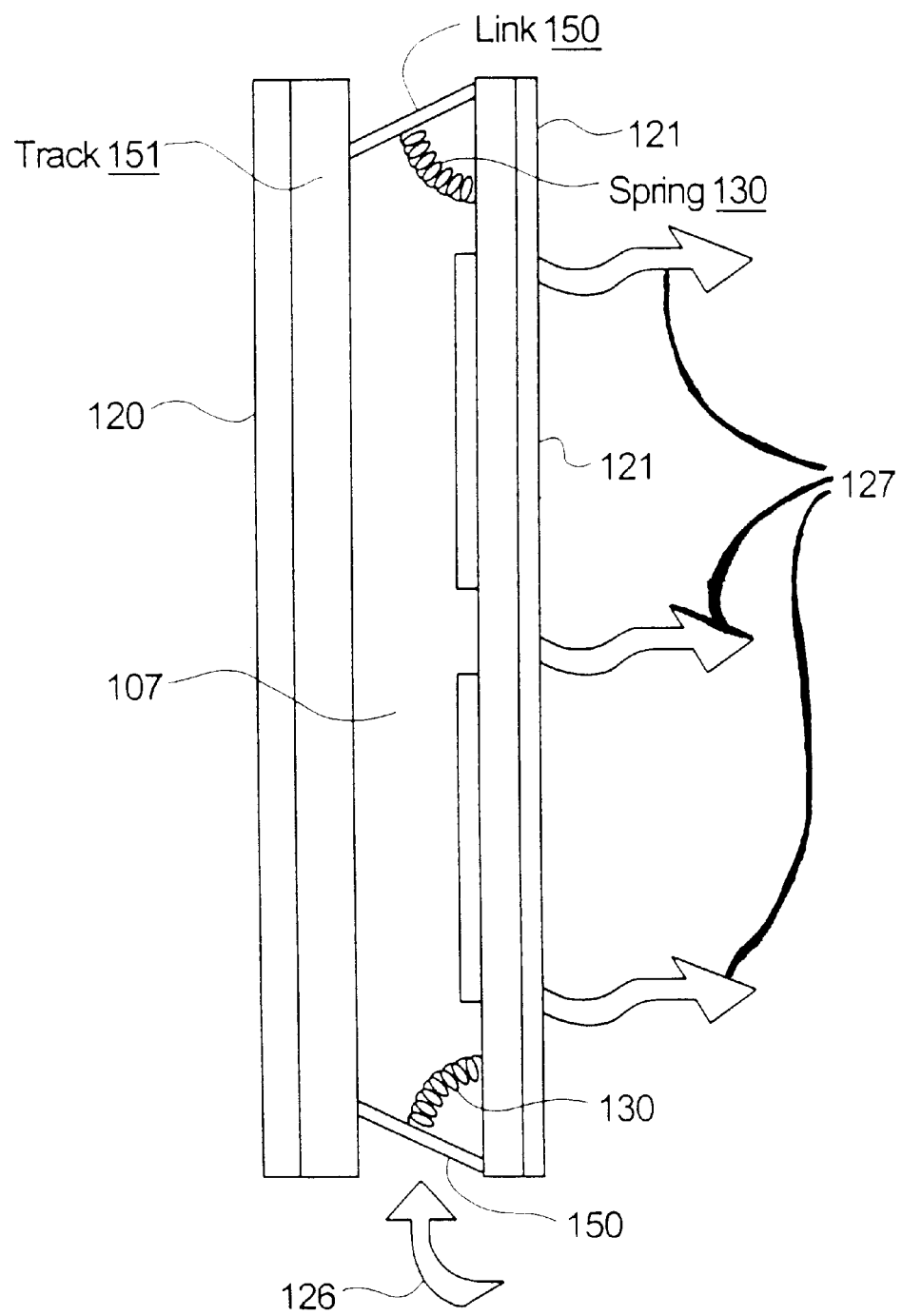

FIGS. 3, 4 and 5 illustrate various embodiments of the coupling mechanism of the present invention. None of the separate and distinct components of the first and second sub-assemblies 120 and 121, respectively of the lid assembly are shown so as to avoid obscuring the coupling mechanism that may be used between the sub-assemblies to create or reduce vented air space 107 of the present invention.

FIG. 3 illustrates one embodiment of the coupling mechanism of the present invention. Referring to FIG. 3, springs 130 are included between the first sub-assembly 120 and the second sub-assembly 121. When the lid assembly is closed, springs 130 compress to reduce vented air space 107 that exists between the thermal insulation and the electronic component modules. When the lid assembly is open, the springs extend to their relaxed position, thereby creating the vented air space. Note that any number of springs may be utilized.

In an alternate embodiment, flexible expansion limiters 131 may couple the first and second sub assemblies to limit the distance that the springs may expand when creating vented air space 107 while the lid assembly is in the open position.

FIG. 4 illustrates the use of open cell foam strips 140 between the first and second sub-assemblies. When the lid assembly is in the closed position, foam strips 140 compress between the first and second subassemblies, thereby reducing vented air space 107. When the lid assembly is open, the foam takes its normal shape, causing vented air space 107 to be recreated. Note that any amount of foam may be utilized. In one embodiment, foam strips 140 are disposed near the edges of the sub-assemblies 120 and 121. In an alternate embodiment, separated portions of foam are dispersed along the edges of the first and second assemblies. In one embodiment, the foam has a thickness of 10 mm uncompressed and 5 mm compressed.

FIG. 5 illustrates another embodiment of the coupling mechanism between the first and second sub-assemblies 120 and 121, respectively of the present invention. Referring to FIG. 5, separate spring loaded links 150 couple the first and second sub-assemblies. A portion of each link 150 is coupled to a track 151 in the first sub-assembly 120. Track 150 enables the link 150 to slide between a position wherein spring 150 is compressed to another position where spring 150 has expanded. It should be noted that track 151 may be included in the second sub-assembly 121 while the link 150 is attached and/or mounted to the first sub-assembly, such that the arrangement is reversed.

Note that the attachments of the various springs and foam between the first and second sub-assemblies may be attached to either the plastic casings of the first and second sub-assemblies or between the thermal insulation and thermal plate of the first and second sub-assemblies.

Thus, the various embodiments of the present invention achieve a very efficient heat removal system for a portable computer system. In addition, the invention has minimal adverse ergonomics side effects like noise and vibration or hot spots on the external skin that are uncomfortable to the touch and that can cause injury. This is achieved in the present invention by transferring the heat from the electronics to a thermal plate that spreads the heat over a large surface area on the back of the display where it is transferred out of the system and into the air. Optionally, an expandable vented air space can be added to allow air flow for additional cooling and increase thermal insulation between the sensitive display and the hot electronic components.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of various embodiments are not intended to limit the scope of the claims which in themselves recite only those features regarded as essential to the invention.

We claim:

1. A portable computer comprising:
   a base; and
   a lid assembly pivotally supported by the base, the lid assembly including:
      first and second sub-assemblies, each being substantially planar;
      a coupling mechanism that maintains a first spaced-apart relationship between the first and second sub-assemblies when the lid assembly is in a first pivotal position with respect to the base, the first and second sub-assemblies being in a second spaced-apart relationship when the lid assembly is in a second pivotal position with respect to the base;
      wherein the first spaced-apart relationship creates an air space between the first and second sub-assemblies, and the second spaced-apart relationship substantially eliminates the air space.

2. The portable computer of claim 1 wherein the first pivotal position is an open position.

3. The portable computer of claim 2 wherein the second pivotal position is a closed position.

4. The portable computer of claim 3 wherein the lid assembly is latched to the base when in the closed position.

5. The portable computer of claim 3 wherein the first sub-assembly comprises:
   a display panel having a front and a back; and
   an insulating layer having a high thermal resistance attached to the back of the display panel.

6. The portable computer of claim 5 wherein the first sub-assembly further comprises a front bezel mounted against the front of the display panel.

7. The portable computer of claim 5 wherein the display panel is a LCD panel.

8. The portable computer of claim 5 wherein the second subassembly comprises:
   a circuit board having electronic components mounted thereon; and
   a plate having a high thermal conductivity that is in thermal contact with the electronic components.

9. The portable computer of claim 8 wherein the circuit board is physically disposed in the second sub-assembly so as to be exposed to the air space when the lid assembly is in the second pivotal position with respect to the base.

10. The portable computer of claim 8 wherein the second subassembly further comprises an outer plastic casing.

11. A portable computer comprising:
    a base; and
    a lid assembly hinged to the base, the lid assembly including:
       first and second sub-assemblies, each being substantially planar;
       a coupling mechanism that establishes a spaced-apart relationship between the first and second sub-assemblies when the lid assembly is in an open position with respect to the base, and a proximate relationship when the lid assembly is in a closed position with respect to the base; and
       wherein the space-apart relationship allows heat-removing airflow between the first and second sub-assemblies.

12. The portable computer of claim 11 wherein the lid assembly is latched to the base when in the closed position.

13. The portable computer of claim 11 wherein the first sub-assembly comprises:
    a LCD panel having a front screen and a rear surface; and
    an insulating layer having a high thermal resistance fixedly attached to the rear surface of the LCD panel.

14. The portable computer of claim 13 wherein the first sub-assembly further comprises a front bezel mounted against the front screen of the LCD panel.

15. The portable computer of claim 13 wherein the second sub-assembly comprises:
    a circuit board having one or more electronic modules mounted thereon; and
    a plate having a high thermal conductivity that is thermally connected to the one or more electronic modules.

16. The portable computer of claim 15 wherein the second sub-assembly further comprises an external casing that is attached to the plate with a thermal adhesive.

17. The portable computer of claim 15 wherein the one or more electronic modules substantially contacts the insulating layer when the lid assembly is in the closed position with respect to the base.

18. The portable computer of claim 11 wherein the coupling mechanism comprise springs that compress when the lid assembly is in the closed position with respect to the base, the springs extending to a relaxed position the lid assembly is in the open position with respect to the base.

19. The portable computer of claim 11 wherein the coupling mechanism comprise spring-loaded links coupled between the first and second sub-assemblies.

20. The portable computer of claim 19 wherein a portion of each link is coupled to a track located in either the first or second sub-assembly, the track enabling the link to slide between a spring-compressed position and a spring-extended position.

21. The portable computer of claim 11 further comprising members that limit an expansion distance of the first and second sub-assemblies when the lid assembly is in the open position with respect to the base.

22. The portable computer of claim 11 further comprising a foam disposed between the first and second sub-assemblies, the foam being compressed between the first and second sub-assemblies when the lid assembly is in the closed position with respect to the base, and the foam expanding when the lid assembly is in the open position with respect to the base.

23. The portable computer of claim 11 wherein the foam comprises closed cell foam disposed along edges of the first and second sub-assemblies.

* * * * *